Feb. 20, 1940.         M. E. MARTELLOTTI         2,191,131
                        BACKLASH ELIMINATOR
              Filed Nov. 30, 1938           2 Sheets-Sheet 1

INVENTOR.
MARIO E. MARTELLOTTI
BY
H. K. Parsons
ATTORNEY.

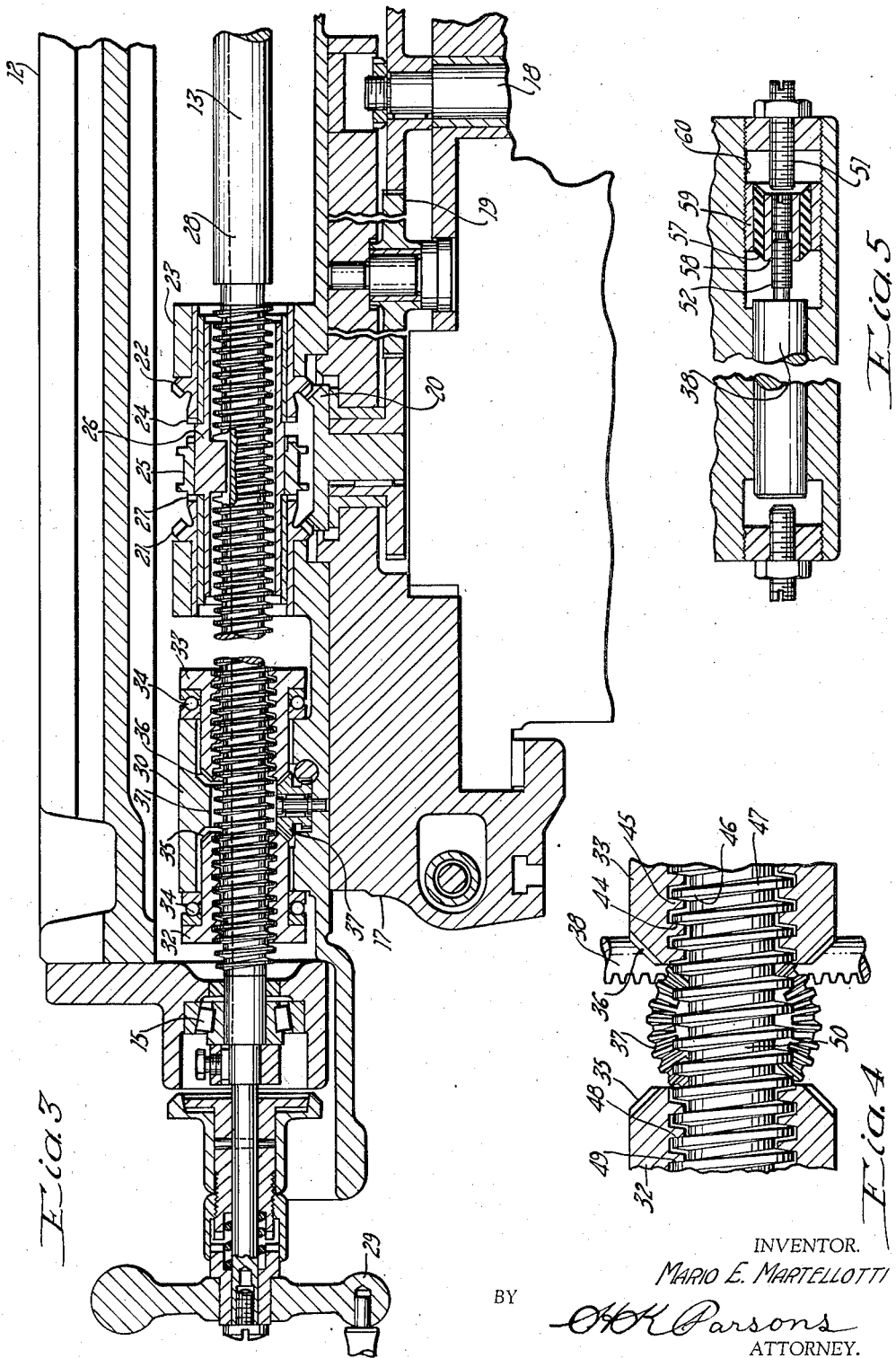

Patented Feb. 20, 1940

2,191,131

UNITED STATES PATENT OFFICE 2,191,131

BACKLASH ELIMINATOR

Mario E. Martellotti, Cincinnati, Ohio, assignor to The Cincinnati Milling Machine Co., Cincinnati, Ohio, a corporation of Ohio Application November 30, 1938, Serial No. 243,214

14 Claims. (Cl. 90—22)

This invention relates to actuating mechanisms for movable supports of machine tools and the like, and has for an object the provision of improved means for the elimination of backlash between the moving support and its drive in such a manner that the lost motion is only taken up when the actual necessity for it arises so that there will not be a continuous drag on the moving parts, causing unnecessary wear and loss of power.

Another object of this invention is to provide a simple and inexpensive mechanism for the purposes described, and one which comprises a relatively few number of parts.

Another object of this invention is to provide a mechanism which is at all times sensitive to the operating conditions in the machine so that it may become effective automatically to eliminate backlash when the operating conditions so dictate.

A further object of this invention is to provide a mechanism of the character described which is automatic to the extent that it needs no special controls, nor any attention on the part of the operator to render it effective or ineffective.

An additional object of this invention is to provide a backlash eliminator which is so efficient that manual feeding of the table under hook-in cuts is made possible.

Still another object of this invention is to provide a backlash eliminator which is self-adjusting for wear or pitch variation of the lead screw.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a section taken on the line 3—3 of Figure 2.

Figure 4 is an enlarged detail view showing the static relation of the nut members with respect to the lead screw.

Figure 5 is a detail view showing a modified form of a part of the invention.

Figure 1:
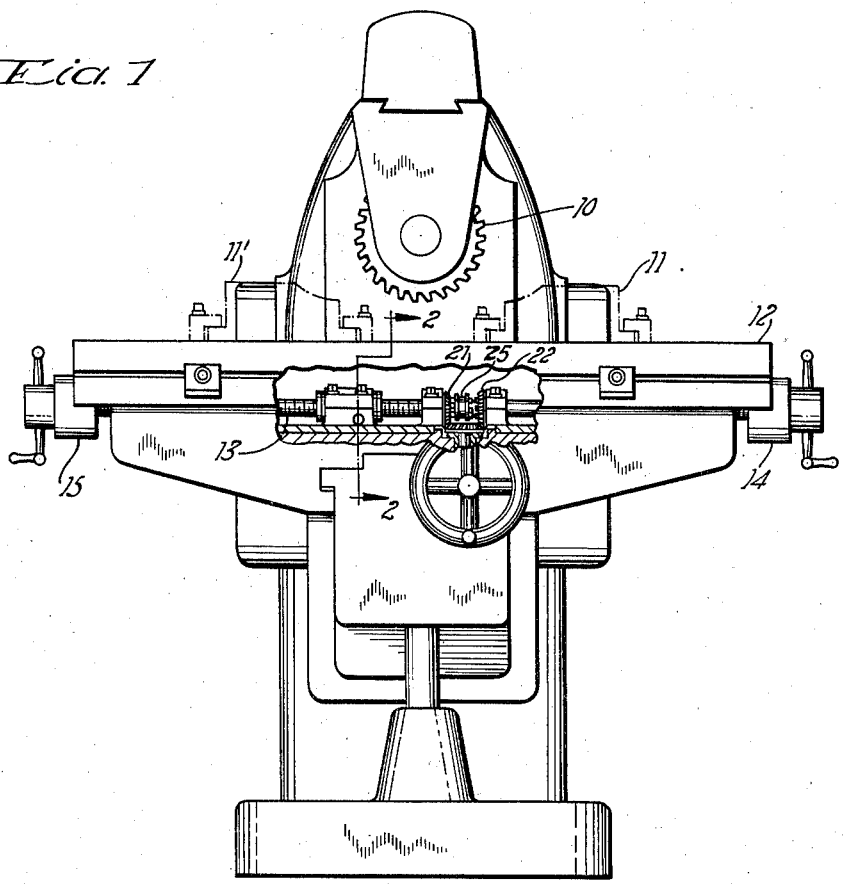
Figure 1 is a front elevation of a machine tool embodying the principles of this invention.

Referring to the drawings, Figure 1 indicates a machine suitable for the application of this invention, the machine shown being a milling machine having a cutter 10 which may be rotated in a counterclockwise direction for effecting up-cutting on a work piece 11 supported on table 12 when the latter is feeding toward the left, or for effecting down or hook-in cutting on a work piece 11 when the table is feeding toward the right. Down or hook-in cutting is often referred to as climb milling and the latter term will, therefore, be used herein to distinguish from up-cutting which will be defined herein as normal milling. It will be obvious that when the table is feeding toward the left, that the cutter will act to resist the movement of the table, and when feeding toward the right the cutter will tend to pull or assist the movement of the table. In the latter case, if any lost motion exists in the drive to the table it will permit the cutter to effect an abnormal advance of the table which may be beyond the capacity of the tool and thus cause breakage of the parts.

In this machine the work support 12 is driven by a rotatable screw 13 which is anti-frictionally journaled as at 14 and 15 in opposite ends of the table, but held against relative axial movement with respect thereto. This invention is directed to means for effecting axial advance of the screw without permitting abnormal fluctuations in the rate of table feed.

Figure 2:
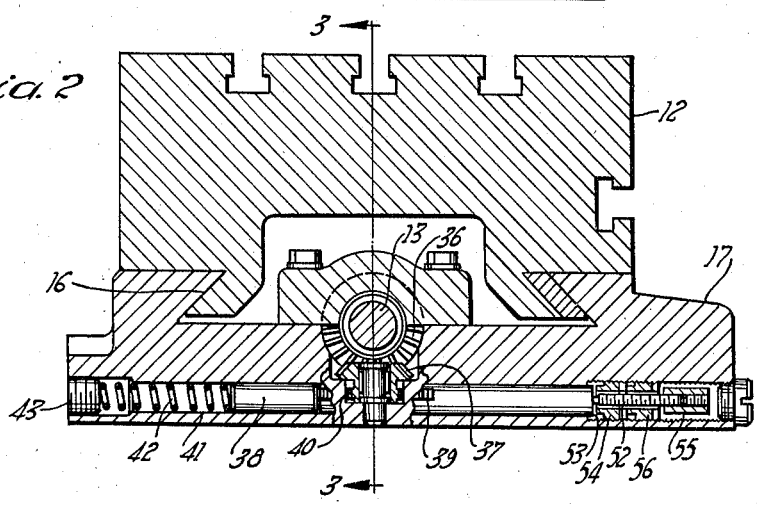
Figure 2 is an enlarged section taken on the line 2—2 of Figure 1.

As shown in Figure 2 the table slides in a dovetailed guideway 16 relative to a support 17. The feed screw 13 is adapted to be power actuated by a power driven shaft 18 which is selectively connected through gearing for effecting opposite directions of rotation of the screw. A spur gear train, indicated generally by the reference numeral 19, transmits motion from shaft 18 to a bevel gear 20 which intermeshes with a pair of bevel gears 21 and 22 supported for rotation in the housing 23. The bevel gears have clutch teeth 24 on their opposing faces which are selectively engaged by clutch teeth formed on opposite faces of a shiftable clutch member 25. The clutch member 25 is keyed to a sleeve 26 which in turn has a key 27 engaging the spline 28 formed in the screw. The clutch 25 may be shifted to a neutral position whereby the screw may be manually rotated in the conventional manner by the manually operable lever 29 connectible with the end of the screw. The shaft 18 is adapted to be rotated at relatively slow or feeding rates, and at a relatively fast or quick traverse rate but since such mechanisms are old and well-known and form no part of the present invention they are not illustrated herein.

The support 17, as shown in Figure 3, is provided with an abutment 30 in which is formed an aperture 31 through which the feed screw may freely pass. A pair of threaded members or nut elements 32 and 33 are threaded on the screw for rotation into engagement with opposite ends of the abutment. Anti-friction thrust bearings 34 are interposed between the threaded members and the abutment. It will be noted that the abutment serves to prevent axial movement of the threaded members in one direction, but that they are free to be rotated relative to the screw in a direction away from the abutment. Therefore, when the table is being moved toward the left under idle conditions, the nut element 32 acts as the driving nut because it takes the reaction of the screw and transmits it to the abutment 30; and when the table is feeding toward the right, the nut element 33 serves as the driving nut for similar reasons.

Thus, when one nut element is serving as the driving nut, the other one is free to serve as a hold-back to eliminate backlash. It will be obvious, however, that when a heavy load is on the table and normal milling is being performed, there is no necessity for the hold-back element to function and furthermore it would only act as an additional load on the feed screw. In such a case, the hold-back element is rendered ineffective automatically but is held in potential readiness to assume its role whenever the necessity arises.

This automatic action is obtained by means of the following mechanism. The nut elements 32 and 33 are provided on their opposing ends with bevel gears 35 and 36 respectively which intermesh with a common bevel gear 37.

This gearing interconnects nut elements 32 and 33 for simultaneous rotation relative to the lead screw but in opposite directions with respect to one another. This means that they cannot be jointly rotated in the same direction. This results in a number of possible combinations of motions of the two nut elements and the lead screw. For instance, as first combination, the nut element 33 may rotate clockwise while the lead screw remains stationary, thus causing counterclockwise rotation of the nut element 32 whereby both nut elements move away from the abutment 30.

In the second combination the nut element 33 may rotate in a counterclockwise direction while the lead screw remains stationary, thus causing clockwise rotation of nut element 32 whereby both nut elements move toward the abutment 30. In the third combination the nut element 33 may rotate jointly with the screw in a clockwise direction, thus causing counterclockwise rotation of nut element 32 with the result that the latter moves away from the abutment but at a faster rate than in the first combination because the direction of rotation of the screw produces an additive effect. It will be obvious in this combination that, since the nut element 33 is jointly rotating with the screw, it will not move relative to the abutment 30.

In the fourth combination the nut element 33 and the lead screw may rotate jointly in a counterclockwise direction causing the nut element 32 to approach the abutment but at a faster rate than in the second case because the opposite rotation of the screw produces an additive effect. The last two combinations may be repeated with respect to the nut element 32 rotating with the screw in either one of two directions, one of which will cause the nut element 33 to move away from the abutment and the other causing it to move toward the abutment, while the nut element 32 remains stationary with respect to the abutment.

All of these combinations of motions occur at one time or another in the operation of the machine. The machine itself has four possible methods of operation such as rotation of the lead-screw in a clockwise or a counterclockwise direction with the cutter rotating to effect climb milling; rotation of the lead screw in a clockwise or counterclockwise direction with the cutter rotating in a direction to effect normal milling.

It is necessary, in order to explain the operation, to assume that the parts are in some given static position and it will, therefore, be assumed that the nut elements are in the position shown in Figures 3 and 4, in which they are both in engagement with opposite sides of the abutment 30, that the table is about to feed toward the left as viewed in Figure 1, and that the cutter is rotating in a direction to cut up on the work piece 11 and thereby oppose the direction of feed.

When power is connected to the lead screw as by throwing the clutch 25, a certain amount of frictional torque is immediately developed between each nut element and the screw due to friction, and unless held against rotation both nut elements 32 and 33 would tend to rotate with the screw. This, of course, is impossible due to the gearing connection between them. Since it is also impossible for the friction between each nut element and the screw to be exactly the same for any period of time, the nut element having the greater frictional connection with the screw will rotate with it. Since the table feed is toward the left the greater friction will most likely be on the nut element 32 which will, therefore, be rotated by and with the screw. This will cause rotation of the bevel gear 37 in a direction to cause rotation of the nut element 33 relative to the screw and in a resultant axial direction away from the abutment 30. No feeding movement of the table can take place until the nut element 32 is held against rotation since it is the driving nut. Means are, therefore, provided for limiting the rotation of the bevel gear, and this is accomplished by interconnecting the bevel gear through a rack and pinion connection to a plunger 38 which has an adjustable stop attached thereto for limiting its movement.

As shown in Figure 2, the plunger 38 has a reduced threaded portion 52 on the end which provides a shoulder 53 adapted to engage a first fixed abutment 54 when the plunger moves in one direction, and to which an adjustable stop member 55 may be threadedly connected for engagement with a second fixed abutment 56 when the plunger moves in the other direction. It will be noted that the threaded member 52 passes freely through the center of the fixed abutments 54 and 56. There is a certain amount of lost motion between the plunger 38 and the abutments so that only a small movement in either direction is provided. This means that the nut element 32 will only rotate through a small angle before its rotation is limited whereby the lead screw will feed through the nut element and cause movement of the support.

By shifting clutch 25 the lead screw 13 may be reversed and this will momentarily reduce the friction between itself and the nut element 32 and increase the friction between itself and the nut element 33. This will cause the nut element 33 to rotate with the screw, momentarily causing rotation of the bevel gear 37, a backing-off of the nut element 32 and shifting of the plunger 38 in the opposite direction. The plunger will stop rotation of the nut element 33 whereby the lead screw will feed the table. It will be noted that in each of these cases one of the nut elements served as a driver and the other was backed off to reduce the friction between itself and the lead screw to a minimum, thus causing little or no addition to the load on the screw.

Assuming the table to continue to move toward the right until the work piece 11' engages the cutter, it will be apparent that the cutter is rotating in a direction to assist the movement of the table. As soon as the cutter engages the work there would be a tendency to pull the lead screw 13 axially and this would immediately increase the friction between the lead screw and the nut element 32, and decrease the friction between the lead screw and the nut element 33. This sudden change would cause the nut element 32 to rotate with the lead screw, causing clockwise rotation of the bevel gear 37 as viewed in Figure 4, and rotation of the nut element 33 in a direction to cause it to feed at a fast rate toward the abutment 30. In other words, the nut element 33 is now wedged between the abutment 30 and the left hand face of the screw thread 46, increasing the friction between itself and the screw, and this frictional resistance is retransmitted back through the bevel gearing to the nut element 32 to resist further rotation thereof whereby the feeding movement will again take place. It might seem that this would tend to cause the nut elements to lock up but it must be remembered that the screw is rotating in a direction to cause rotation of the nut element 33 in a direction to unlock the nut element 32. The nut element 33 is still the driving nut while the nut element 32 serves as the hold-back nut to prevent inadvertent acceleration of the table by the cutter.

When the milling tool ceases cutting it releases the pull on the lead screw, resulting in a decrease in the friction between the hold-back nut and the lead screw and an increase in friction between the driving nut and the lead screw. This will cause some rotational adjustment of the driving nut which, in turn, will back off the hold-back nut, thus positioning the parts for normal driving.

The operation of the device may be improved by utilizing a spring which, as shown in Figure 2, may be mounted in the plunger bore 41 between the end of the plunger 38 and a plug 43 threaded in the end of the bore. This plug may be initially adjusted to produce the desired tension in the spring 42 which will serve to preload the mechanism and establish a definite rotational pressure on the elements 32 and 33. This pressure is sufficient when the machine is idle to maintain the nut elements 32 and 33 in engagement with opposite ends of the abutment 30 and thus create a desired amount of friction between the threads of the nut elements and the threads of the lead screw.

In other words, the parts will be in the static condition shown in Figure 4 in which the right hand face 44 of the thread 45 engages the left hand face 46 of the screw thread 47; and the left hand face 48 of the thread 49 of nut element 32 engages the right hand face of screw thread 47. This will result in a certain amount of tension on that intermediate portion 50 of the lead screw which lies between the nut elements. In addition, each nut element is held in frictional engagement with the threads of the lead screw thus creating a potential frictional torque on the screw which becomes effective immediately upon rotation of the screw.

Without desiring to be limited to the consequences of a theory, the principle of operation is that a spring establishes a potential frictional torque between each nut element and the screw so that regardless of the direction of screw rotation, one of the nut elements will rotate with the screw through a very small angle until the limiting friction is overcome and relative movement occurs. This may be explained by the fact that, at least, some force is needed to move the table even on idling movements, and this force produces an axial reaction on the screw which unbalances the frictional forces between the screw and the respective nut elements. The nut element having the greater frictional engagement with the screw will thus be rotated, causing a reverse direction of rotation of the other nut element and a reduction in its frictional engagement with the screw. In addition, the plunger 38 will be moved through the rack and gear connection in a direction to increase the pressure of the spring 42. This increased pressure aids in breaking the locking friction between the simultaneously rotating nut and screw. It will, therefore, be noted that the spring is under additional pressure during idling movements of the table, whereby when the tool engages a work piece to effect climb cutting and reduces the friction on the driving nut, the spring aids in following up this reduction in friction and serves to rotate the nut elements toward the abutment and especially the hold-back nut whereby the lost motion is taken up sooner.

It will, therefore, be seen that release of the frictional torque on the driving nut permits the spring 42 to rotate the bevel gear by means of the rack and pinion and this simultaneous rotation of the nut elements in opposite directions into engagement with the abutment prevents abnormal acceleration of the table in its incipiency.

In addition, the spring insures that the nut elements are normal in the position shown in Figure 4, as previously stated, and this insures that the same condition will prevail whenever the screw is manually rotated. It is to be noted that the spring does not establish or create enough friction to interfere with manual rotation of the screw under either idle or cutting conditions whereby it becomes possible to manually feed the table during climb cutting which, so far as I know, has never been made possible with prior backlash eliminators.

A modified form of spring for use in connection with the plunger 38 is shown in Figure 5 of the drawings in which an elastic composition material 57 is utilized to connect the bushing 58 which has a threaded connection with the reduced stem 52 of the plunger 38, to an outside bushing 59 threaded in the bore 60. The threaded stem 52 and plunger 38 are rotated in a direction to establish the condition shown in Figure 4 and thus place a light preload on the elastic material 57 whereby movement of the plunger 38 in one direction will increase the load, and movement in the other direction will momentarily decrease and then increase to resist movement of the plunger. Since the resistance against movement of this material rises very rapidly for a small longitudinal movement of the plunger 38 it forms an idle limiting stop in either direction for the plunger.

In addition to automatic control of the backlash in accordance with cutting conditions, this device will automatically compensate for any irregularities in screw pitch as well as for uneven wear of the screw. Under normal milling conditions, these factors are not so important because the cutting thrust is always in one direction and against one side of the thread of one nut member. In climb cutting, however, either of these factors might cause a looseness or tightness between the nut members. In other words, both nut members are drawn up tight against opposite sides of the abutment, putting the intermediate portion of the screw under stress. When a portion of the screw having an irregular pitch passes through this region it increases or decreases this stress, with a resultant increase or decrease in the friction between the nut elements and the screw. Since the driving nut is always under a tendency to rotate with the screw, an increase in friction will cause it to do so, thus bracking off the hold-back nut sufficiently to relieve the abnormal stress condition. On the other hand, the hold-back nut is always exerting a rotational urge on the driving nut in a direction to tighten it so that any looseness is immediately taken up.

There has, therefore, been provided means for translating all the variable factors which affect the feed rate, into terms of friction between a pair of nuts and a lead screw upon which they are solely supported, and utilizing variations in this friction to effect relative rotational adjustment between the nut elements to control the backlash. It will be noted that anti-friction thrust bearings are inserted between each nut element, and the intermediate abutment to eliminate external effects and make the friction between the nut elements and the screw, the sole determining control.

I claim:

1. In a mechanism for effecting movement of a slidable support relative to a fixed support, the combination of a lead screw journaled in the sliding support, an abutment carried by the fixed support, a pair of threaded members mounted on the lead screw in engagement with opposite sides of said abutment, thus creating a pressure on the lead screw, said pressure causing a frictional torque upon rotation of the screw with respect to the threaded member acting as driver, and means responsive to variations in said frictional torque to vary automatically and inversely the frictional torque of the other threaded member with respect to the lead screw.

2. In a machine tool having a fixed support and a movable support, the combination of a screw journaled in the movable support, a pair of nuts threaded on the lead screw, an abutment intermediate the nuts attached to the fixed support, and means to rotate the nuts oppositely relative to said screw into engagement with said abutment whereby external axial thrusts on the screw in either direction will be resisted by said abutment.

3. In a transmission for the movable support of a machine tool, the combination of a lead screw rotatably journaled in said support, a pair of floating nuts threaded on the lead screw, an intermediate fixed abutment, means to rotationally urge the nuts into engagement with said abutment to eliminate any lost motion between the lead screw and said abutment, and means to resist frictional rotation of the nuts by the lead screw during rotation of the latter to actuate the support.

4. In a machine tool having a fixed support and a movable support, the combination of means for effecting relative movement therebetween including a lead screw journaled in one of said supports, a fixed abutment, a pair of members threaded on the lead screw into engagement with opposite sides of said abutment, said threaded members creating a frictional torque on said screw opposing rotation thereof in either direction, means interconnecting said members whereby upon rotation of one by the screw due to an increase in frictional torque, the other will be rotated in a direction to reduce the frictional torque between itself and the lead screw.

5. In a machine tool having a fixed support and a translatable support, the combination of a lead screw journaled in one of said supports, a pair of members threaded on the lead screw, a fixed abutment surrounding said lead screw intermediate said members, resilient means for imparting a rotational urge to said members in opposite directions into engagement with said abutment, thus creating a frictional torque on said screw opposing rotation, means to adjust said resilient means to vary the amount of said frictional torque, said frictional torque increasing upon rotation of the screw sufficiently to cause rotation of one of said threaded members thus increasing the resistance value of said resilient means until relative movement between the screw and the threaded member occurs, said resilient means being potentially effective to increase the frictional torque on the second member upon decrease in the frictional torque with respect to the first member.

6. In a machine tool having a fixed support and a translatable support, the combination of a rotatable lead screw attached to the translatable support for imparting motion thereto, a fixed abutment surrounding a portion of said lead screw, a pair of nut members threaded on the lead screw on opposite sides of said abutment, beveled gearing interconnecting said members for simultaneous opposite rotation, a spring pressed plunger for actuating said gearing to engage said members with said abutment whereby lost motion between the screw and said abutment is eliminated and a frictional torque is created between each member and the screw, said torque being sufficient with respect to the driving member to cause simultaneous rotation thereof, said gearing reversely rotating the other member to effect reduction in the frictional torque whereby the lead screw may drive the support without undue resistance.

7. In a machine tool having a fixed support and a movable support, the combination of a lead screw rotatably journaled in one of said supports, a fixed abutment surrounding a portion of said screw, threaded members engaging opposite sides of said abutment and spaced portions of the screw thread thereby placing an intermediate portion of the screw under tension whereby lost motion is eliminated between the screw and said support, and means operable when the frictional torque between the screw and said threaded members exceeds a predetermined amount to automatically effect a reduction in the tension under which the intermediate portion of said screw is held and thereby a reduction in the frictional torque.

8. In a machine tool having a cutter support and a work suport, the combination of means for effecting relative movement between the supports including a rotatable lead screw attached to the work support, a driving nut threaded on the lead screw and rotated into engagement with a fixed support, pressure means for holding the nut against joint rotation with the screw, and means to automatically increase said pressure means as the friction between the screw and nut increases.

9. In a machine tool having a cutter support and a work support, the combination of a lead screw rotatably mounted in one of said supports, a nut threaded on the lead screw and engageable with an abutment for imparting movement to the work support in one direction, a second nut threaded on the lead screw, and means to automatically rotate said last-named nut into engagement with said abutment and frictional engagement with said screw upon reduction of the driving friction between the screw and the first-named nut.

10. In a machine tool having a support, a movable slide mounted thereon, the combination of means for driving said slide including a rotating lead screw, a driving nut threaded on the lead screw, means positionable in accordance with the frictional torque between the driving nut and the lead screw, a hold-back nut threaded on the lead screw, and means operable by said positionable means to increase the frictional torque of the hold-back nut upon a decrease in the frictional torque between the driving nut and the lead screw.

11. In a machine tool having a translatable support actuable by a lead screw journaled at opposite ends in said support, the combination of a pair of threaded elements supported on the screw in spaced relation, a fixed abutment intermediate said elements and means responsive to rotation of the screw to tighten one of said elements against the abutment and thereby cause axial feeding of the screw and connected support.

12. In a machine tool having a translatable support actuable by a lead screw journaled in the opposite ends of the support, the combination of a pair of threaded elements supported in axially spaced relation on the lead screw, a fixed abutment, means operable upon rotation of the screw to effect relative rotation between the threaded elements whereby one element will be tightened against said abutment to effect axial feed of the screw, and means to limit the amount of said relative rotation.

13. In a milling machine having a rotatable cutter and a translatable slide adapted to support work pieces for alternate engagement with said cutter whereby a normal milling operation will be performed on one work piece and a climb milling operation will be performed on the other work piece, the combination of a lead screw journaled in said slide, a pair of threaded members supported on the screw, a fixed abutment located between said members, and means responsive to the axial reaction on the screw caused by the cutting force to tighten one of said threaded members against said abutment during the normal milling operation and to tighten both of said members against opposite sides of said abutment during the climb milling operation.

14. In a milling machine having a rotatable cutter and a translatable support for moving a work piece into engagement with said cutter to perform climb milling, the combination with a lead screw journaled in said support, of a first threaded element supported on the lead screw, a fixed abutment located adjacent said threaded element whereby the axial thrust on said screw caused by the cutting force will wedge said threaded element between said abutment and the threads of the lead screw and cause rotation of the threaded element with the lead screw, a second threaded element supported on the lead screw on the opposite side of said abutment, and means responsive to rotation of the first threaded element to effect rotation of the second threaded element into engagement with said abutment and thereby prevent further rotation of the first threaded element whereby the second threaded element will act as a driving nut and the first threaded element will act as a hold-back nut.

MARIO E. MARTELLOTTI.